United States Patent [19]
Hakki

[11] Patent Number: 6,011,253
[45] Date of Patent: Jan. 4, 2000

[54] METHODS AND APPARATUS FOR ANALYZING POLARIZATION MODE DISPERSION OF AN OPTICAL DEVICE

[75] Inventor: Basil W. Hakki, Allentown, Pa.

[73] Assignee: Lucent Technologies Inc., Murray Hill, N.J.

[21] Appl. No.: 09/052,756

[22] Filed: Mar. 31, 1998

[51] Int. Cl.$^7$ .................................................... G02F 1/01
[52] U.S. Cl. .......................................... 250/225; 356/364
[58] Field of Search .............................. 250/225, 227.17, 250/214 R, 214.1; 356/364, 365, 367, 73.1; 385/111, 123

[56] References Cited

U.S. PATENT DOCUMENTS

| | | | |
|---|---|---|---|
| 5,227,623 | 7/1993 | Heffner | 250/225 |
| 5,654,793 | 8/1997 | Barlow et al. | 356/73.1 |

OTHER PUBLICATIONS

D. Andresciani et al., "Measurement of the group–delay difference between the principal states of polarization on a low–birefringence terrestrial fiber cable," *Optics Letters*, vol. 12, No. 10, pp. 844–846 (Oct., 1987).

F. Curti et al., "Concatenation of Polarisation Dispersion in Single–Mode Fibers," *Electronics Letters*, vol. 25, No. 4, pp. 290–292 (Feb., 1989).

F. Curti et al., "Statistical Treatment of the Evolution of the Principal States of Polarization in Single–Mode Fibers," *J. Lightwave Technology*, vol. 8, pp. 1162–1166 (Aug., 1990).

G.J. Foschini et al., "Statistical Theory of Polarization Dispersion in Single Mode Fibers" *J. Lightwave Technology*, vol. 9, No. 11, pp. 1439–1456 (Nov., 1991).

N. Gisin et al., "Polarization mode dispersion: time versus frequency domains," *Optics Communciations*, vol. 89, No. 2,3,4, pp. 316–323 (May 1, 1992).

B.W. Hakki, "Polarization Mode Dispersion in a Single Mode Fiber," *J. Lightwave Technology*, vol. 14, No. 10, pp. 2202–2208 (Oct., 1996).

B.L. Heffner, "Accurate, Automated Measurement of Differential Group Delay Dispersion and Principal State Variation Using Jones Matrix Eigenanalysis," *IEEE Photonics Technology Letters*, vol. 5, No. 7, pp. 814–814 (Jul., 1993).

B.L. Heffner, "Automated Measurement of Polarization Mode Dispersion Using Jones Matrix Eigenanalysis," *IEEE Photonics Technology Letters*, vol. 3, No. 9, pp. 1066–1069 (Sep., 1992).

C.D. Poole et al., "Dynamical equation for polarization dispersion," *Optics Letters*, vol. 16, No. 6, pp. 372–374 (Mar. 15, 1991).

C.D. Poole et al., "Phenomenological Approach to Polarization Dispersion in Long Single–Mode Fibres," *Electronics Letters*, vol. 22, pp. 1029–1030 (Sep., 1986).

*Primary Examiner*—Que T. Le

[57] ABSTRACT

Methods for analyzing polarization mode dispersion of an optical device is provided. Various desired qualities of the device, including position dependent optical and physical qualities, can be determined. Experimental wavelength-dependent PMD data are provided that characterizes the entire optical device. The experimental data are Fourier transformed and an experimental Fourier transform is constructed. A theoretical Fourier transform is calculated and fit to the experimental transform by varying at least one parameter. Based on the fit parameters, one or more qualities, including a PMD profile of the device, can be determined. An apparatus for use with this method is also provided.

57 Claims, 7 Drawing Sheets

METHODS AND APPARATUS FOR ANALYZING POLARIZATION MODE DISPERSION OF AN OPTICAL DEVICE

BACKGROUND OF THE INVENTION

This invention relates to optical transmitting devices. More particularly, this invention relates to methods and apparatus for analyzing polarization mode dispersion in optical transmitting devices, such as single mode optical fibers.

Long distance transmission of digitally modulated information through an optical fiber is hampered at high bit rates by pulse distortion caused by chromatic dispersion and polarization mode dispersion (hereinafter, "PMD"). In addition to fiber birefringence, PMD is caused by intrinsic and extrinsic perturbations in the optical fiber. Intrinsic perturbations $P_i$ are local defects that exist in a fiber that cause random misalignment $\theta$ between the Stokes vectors of the Principal States of Polarization (hereinafter, "PSP") of light and the local axes of birefringence. The average spacing $L_i$ between intrinsic perturbation $P_i$ is given by the length L of the fiber divided by the total number $N_i$ of intrinsic perturbations that occur in that length. In contrast to intrinsic perturbations, extrinsic perturbations Pe correspond to disturbances that are produced at the physical splices between optical elements that make up a composite fiber.

PMD is especially limiting at high digital transmission rates (e.g., at rates of gigabytes per second or more). In particular, PMD causes light to split into two PSP with two group delays. See, e.g., Poole et al., "Phenomenological Approach to Polarization Dispersion in Long Single Mode Fiber," *Electronics Letters*, Vol. 22, September 1986, pp. 1029–1030 (hereinafter, "Poole et al."). Furthermore, during transmission through optical fibers PMD can lead to broadening of optical pulses. Accordingly, PMD may limit transmission to low frequencies and relatively short optical fiber lengths.

General and rigorous mathematical models have been developed to describe these PMD limitations, including the models developed by Poole et al. and Foschini et al. "Statistical Theory of Polarization Dispersion in Single Mode Fiber," *Journal of Lightwave Technology*, Vol. 9, November 1991, pp. 1439–1456. These and other models detail the PMD dependence on time, temperature, and wavelength in an optical fiber. Generally, such models involve theoretically "constructing" an optical fiber from an arbitrary number of concatenated optical elements and allowing certain optical parameters, such as the birefringence, to vary randomly according to an arbitrary distribution. Therefore, if the PMD dependence on wavelength of a real optical fiber is known (i.e., measured), a theoretical fiber can be modeled, or constructed, by varying the optical parameters of the optical elements that make up that fiber until the theoretical fiber has a PMD dependence on wavelength that is similar to that of the real fiber. These prior theoretical models, however, do not show or suggest any way of analyzing individual optical elements that make up the fiber using measured PMD data for the entire fiber.

It is therefore an object of the present invention to provide a method for analyzing individual optical elements that make up an optical device.

It is also an object of the present invention to provide a method for determining how PMD, or any other optical and physical parameter that characterizes the device, varies statistically along the length of the device.

It is a further object of this invention to provide apparatus for use with these methods.

SUMMARY OF THE INVENTION

This and other objects of the invention are accomplished in accordance with the principles of the present invention by providing methods and apparatus for analyzing an optical device so that desired qualities of the device, including position dependent optical and physical qualities, can be determined. The method includes at least five steps. In a first step, experimental wavelength-dependent PMD data are provided that characterize the entire optical device and from which statistical quantities, such as the PMD mean and standard deviation, may be obtained. In a second step, the PMD dependence on wavelength is Fourier transformed and an experimental Fourier transform (i.e., a spectrum) is constructed. In a third step, a theoretical Fourier transform is calculated that depends on at least one parameter that characterizes the device. In a fourth step, the PMD mean, PMD standard deviation, and theoretical transform are fit to their respective experimental counterparts by varying at least one parameter. And in a fifth step, a quality of the device is determined based on the parameter.

Another object of the present invention is to provide an apparatus for use with the above-described method for analyzing such an optical device. Such an apparatus includes a processing unit, such as a personal computer, and a means for providing experimental data to that processing unit. The processing unit should at least include means for Fourier transforming the experimental data to construct an experimental Fourier transform, means for calculating a theoretical Fourier transform that depends on at least one parameter that characterizes the device or element of the device, means for fitting the theoretical transform to the experimental transform by varying the parameter, and means for determining a quality of said device based on that parameter. Any conventional means for processing the data, including Fourier transforming the PMD dependence on wavelength, may be used in accordance with this invention, including a computer programmed with software sold under the trademark Mathcad®, available from MathSoft, Inc., of Cambridge, Mass.

It should be clear to a person of ordinary skill in the art that each of the means described herein may be combined into a single processing unit, as described above, or be separate units capable of transferring data therebetween, such as by a data bus.

Further features of the invention, its nature and various advantages, will be more apparent from the accompanying drawings and the following detailed description of the preferred embodiments.

DETAILED DESCRIPTION OF THE PREFERRED EMBODIMENTS

Figure 1:
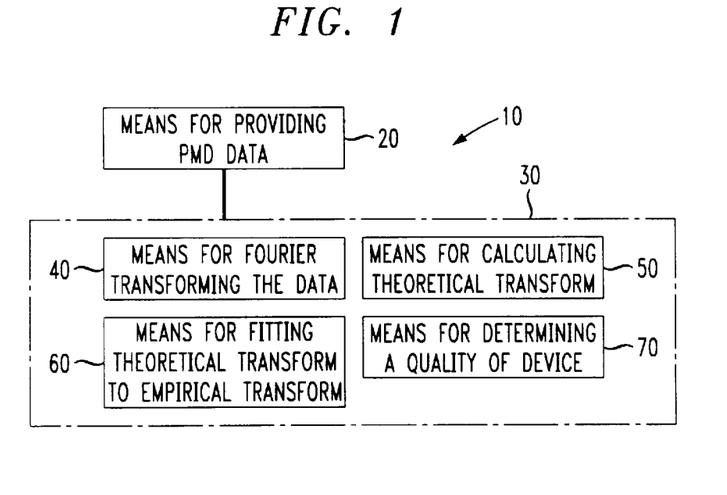
FIG. 1 is a simplified block diagram of an illustrative embodiment of an apparatus for analyzing a single mode optical device according to this invention.

According to the present invention, an apparatus and method for analyzing an optical device are provided. As shown in FIG. 1, apparatus 10 at least includes means for providing experimental data 20 and processing unit 30. Processing unit 30 includes means for processing 40 for processing the experimental PMD dependence on wavelength to derive the PMD mean and standard deviation, as well as for Fourier transforming the data. Processing unit 30 further includes means for calculating 50, which calculates the theoretical counterparts to PMD mean and standard deviation, and means for fitting the theoretical transform to the experimental transform by varying the parameter, and means for determining a quality of the device based on that parameter. The exact function and purpose of each of the above-listed means that make up apparatus 10 is described below with reference to method 100 shown in FIG. 2 and various examples of deconstruction according to this invention.

Figure 2:
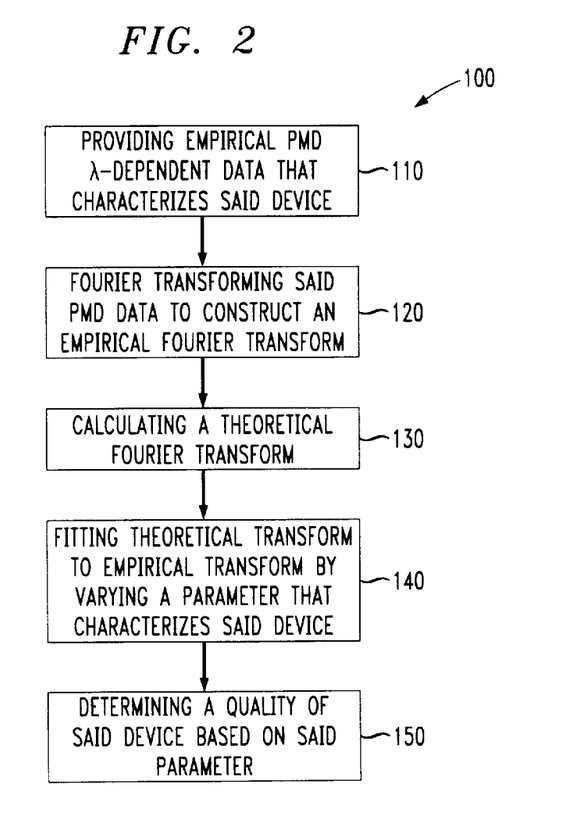
FIG. 2 is a flow chart of steps for carrying out an illustrative embodiment of a method for analyzing a single mode optical device according to this invention.

In accordance with this invention, method 100 of FIG. 2 is an illustrative sequence of steps for analyzing the PMD and any other physical or optical property related to PMD of an optical device. Method 100 includes: providing experimental wavelength-dependent polarization mode dispersion data that characterizes the optical device in step 110, Fourier transforming the experimental data to construct a Fourier transform in step 120, calculating a PMD mean, standard deviation, and a theoretical Fourier transform that depend on at least one parameter that characterizes the device in step 130, fitting the theoretical values to the experimental values by varying the at least one parameter in step 140, and determining a quality of the device based on the parameter in step 150. The exact order in which these steps are performed is not critical to this invention.

In step 110, the PMD wavelength-dependent experimental data may be provided using any conventional method, such as the method shown in Heffner U.S. Pat. No. 5,227,623 (hereinafter, "Heffner"), which is hereby incorporated by reference in its entirety herein. Heffner deduces the experimental PMD data after measuring certain transmission responses of the device. That calculation uses a Jones-matrix eigenanalysis technique and can be performed by a commercially available polarization analyzer (such as the one sold under by the Hewlett-Packard Company, a corporation of California, under Model No. HP8509B). Generally, the technique involves launching a polarized light beam with three sequential states of polarization at more than one wavelength corresponding to input electric fields, measuring the transmission responses of the device for each of the states at each wavelength, calculating Stokes parameters based on the measured responses, computing a Jones matrix for the device from the input and output vectors, and computing the polarization mode dispersion of the device from the derivation of the Jones matrix. Although the wavelength dependence of the PMD data used in accordance with this invention may include a range of wavelengths anywhere between about 1200 nm to about 1600 nm (the wavelengths used for conventional high speed data transmission), this invention may be used for wavelengths that are greater or less than the this range.

In step 120, the data provided in step 110 is processed. During processing, the PMD mean and standard deviation may be obtained and the Fourier transform may be constructed. This transform process may include Fourier transforming the experimental data to obtain a transformed experimental data set, or spectrum, and then fitting a function to the transformed data set to construct the experimental Fourier transform function that can be subsequently used in step 140. Alternatively, the transformed experimental data may be used directly in step 140.

Figure 5:
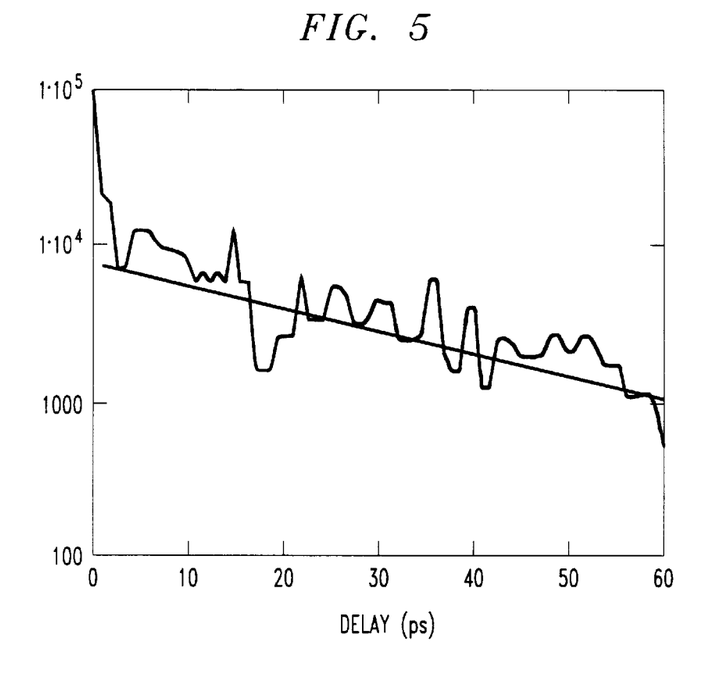
FIG. 5 is a Fourier transform of analytically derived PMD wavelength-dependent data for a hypothetical optical fiber (not shown) having 100 elements. The analytical model assumed that the PMD of each element is random and uniformly distributed between 0 and 7.2 ps and that the splicing angles of those elements are random and uniformly distributed between $-\pi$ and $+\pi$.

The fitting function used in step 120 may be an exponential function that is a multiplicative product of a constant coefficient and an exponential term. The exponential term includes an exponent, which is equal to the PMD divided by a decay time constant. Fitting in step 120 may involve fitting the transformed data to the function using a linear regression technique when the data is plotted on a logarithmic plot, as shown in FIG. 5.

In step 130, the theoretical transform may be calculated by a two step process. The first step is calculating theoretical wavelength-dependent PMD of the device, and the second step is Fourier transforming that theoretical PMD in order to construct a theoretical Fourier transform. The first calculating step may involve calculating a theoretical PMD by using a transmission matrix method. See, F. Curti et al., "Concatenation of Polarization Dispersion in Single Mode Fibers," *Electronics Letters*, Vol. 25, September 1989, pp. 290–291. That method is especially useful when the optical device includes a small number of optical elements, such as a small number of concatenated fiber draws. Although that small number may vary with the nature and type of optical elements that make up the device, the transmission matrix method is preferably used when the number of optical elements is less than about 8 optical elements. When the number of optical elements is large (about 10 or more elements), the calculating process may use any other method, such as one that uses Principal States of Polarization and Differential Group Delays, as described by Gisin et al., "Polarization Mode Dispersion: time versus Frequency Domain," *Optics Communication*, Vol. 89, May 1992, pp. 316–323.

Also in step 130, calculating may involve constructing a theoretical transform by estimating and then varying the number of optical elements in the fiber. Other parameters that may be used to construct a theoretical transform includes misalignment angle $\theta$ and intrinsic birefringence for each of the constituent optical elements.

When the device is a single mode fiber draw, some of the qualities that may be determined in step 150, which may simply be those parameters that were fit to correspond to the draw, include length L, average spacing of intrinsic perturbations $L_i$, intrinsic birefrigence, and angular misalignment $\theta_i$ of Stoke's vectors of Principal States of Polarization relative to intrinsic birefringence axes of the draw. Furthermore, any combination of these qualities may be determined.

As described above, fitting in step 140 comprises varying at least one parameter until one or more statistical quantities, such as the theoretical PMD mean, standard deviation, and experimental transform, are substantially statistically equivalent to their corresponding measured values. The exact degree to which something is considered substantially equivalent depends on the number of statistical quantities used and the degree of accuracy desired. For example, the mean and standard deviation of PMD are two statistical quantities that can be used to characterize a fiber. Although substantial statistical equivalence for a single statistical quantity may be used, substantial statistical equivalence is preferably achieved when two or more statistical quantities are used. For example, the theoretical and experimental transforms may be substantially statistically equivalent when the difference between the magnitude of the experimental function and its decay time constant for the respective experimental values and the theoretical transforms are minimized.

Preferably, a method according to this invention includes repeatedly providing in step 110, transforming in step 120, calculating in step 130 and fitting in step 140. By repeatedly performing these steps, an average value of any desired experimental parameter may be calculated to better characterize the optical device.

Assorted single mode optical fibers and draws are deconstructed in accordance with the principals of this invention in the following examples:

EXAMPLE 1

When the device is made up of a small number of optical elements and the experimental transform includes at least one discernable peak, fitting in step 140 may include the determination of the order of that peak. The order may be primary, secondary, or tertiary. A primary peak corresponds to the PMD value of a single element, a secondary peak corresponds to the mixing (sum or difference) of two elements, and a tertiary peak corresponds to the mixing of primary and secondary peaks of two or more elements. For example, in a three element optical device, each element has a PMD values $\tau_1$, $\tau_2$, and $\tau_3$ and axes that are physically and sequentially rotated by $\pi/4$ radians. As described in Hakki, "Polarization Mode Dispersion in a Single Mode Fiber, *Journal of Lightwave Technology*, vol. 14, October 1996, pp. 2202–2208, the analytical expression for the PMD of such a composite fiber is given by the following equation:

$$\tau^2(\omega) = \tau_1^2 + \tau_2^2 + \tau_3^2 - 2\tau_1\tau_3 \cos(\omega\tau_2) \qquad (1)$$

where $\omega$ is angular frequency. The Fourier transform of $\tau^2(\omega)$ of the entire device has a primary peak at a time that corresponds to the PMD $\tau_2$ of the internal element.

Figure 3:
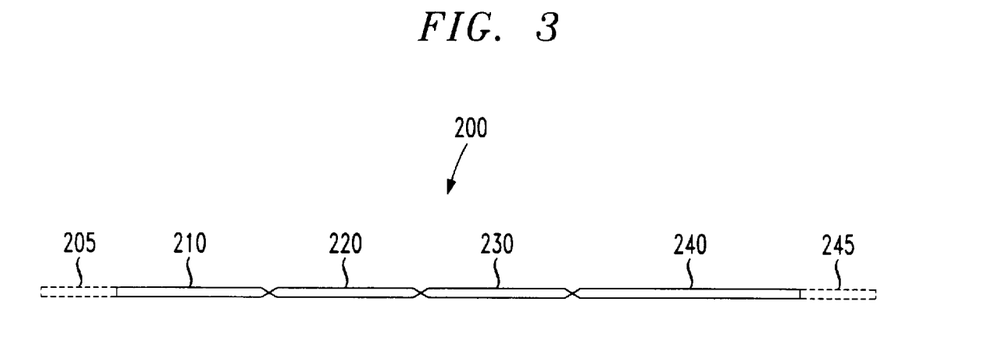
FIG. 3 is a simplified longitudinal view of a composite optical fiber having a plurality of concatenated optical elements that can be analyzed according to this invention.
Figure 4:
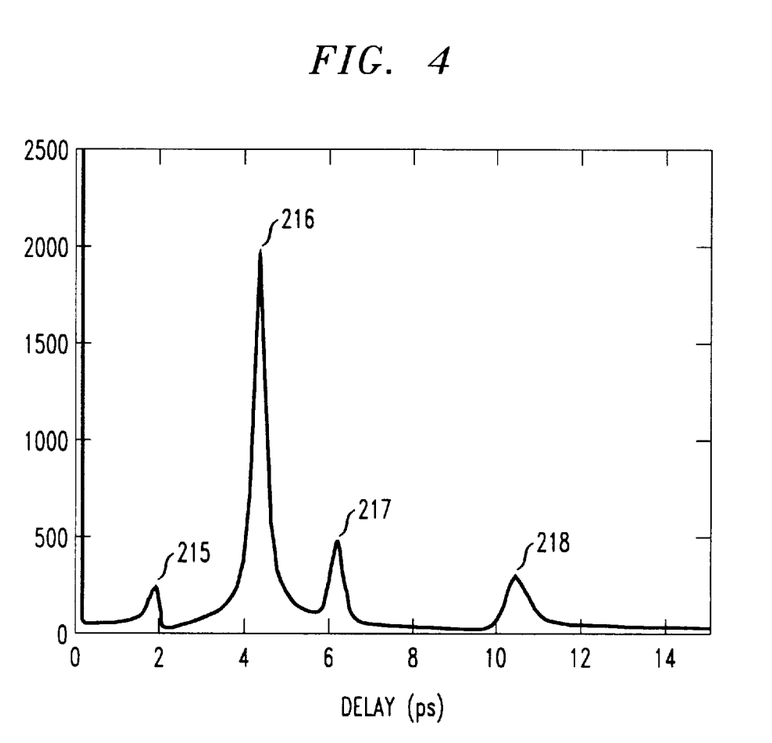
FIG. 4 is a Fourier transform of analytically derived PMD wavelength-dependent data for the composite optical fiber of FIG. 3. The analytical model assumed that FIG. 3 consists of four internal elements with PMD values of 8.755, 6.048, 4.242, and 3.466 and splicing angles equal to 0, 1.72 $\pi$, 1.56 $\pi$, and 1.22 $\pi$ radians, respectively.

As the number of elements of an optical device increases, the number of peaks that arise in its corresponding Fourier transform also increases, making the identification of the order of each peak more difficult. For example, FIG. 3 shows composite single mode fiber 200 having four concatenated elements 210, 220, 230, and 240 having randomly selected PMDs of 8.755 6.048 4.242 3.466, respectively. FIG. 4 shows a Fourier transform of wavelength-dependent PMD of composite fiber 200, where the range of integration used to perform the transform was between 1500 nm and 1550 nm. FIG. 4 shows peaks 215–218 at 1.891 ps, 4.255 ps, 6.146 ps, and 10.4 ps, respectively. As indicated in Table 1, internal elements 220 and 230 give rise to primary peaks 216 and 217, respectively:

TABLE 1

| Element No. | Actual PMD (ps) | Primary Peak | Primary Peak PMD (ps) |
| --- | --- | --- | --- |
| 210 | 8.755 | n/a | n/a |
| 220 | 6.048 | 217 | 6.146 |
| 230 | 4.242 | 216 | 4.255 |
| 240 | 3.466 | n/a | n/a |

Internal elements 220 and 230 also give rise to two secondary peaks 215 and 218. Secondary peak 215 corresponds to a difference between primary peaks 216 and 217 (6.146 ps−4.255 ps=1.891 ps). Secondary peak 218 corresponds to a sum of primary peaks 216 and 217 (6.146 ps+4.255 ps=10.401 ps). Generally, for a fiber with N elements, the total number of primary and secondary peaks P is given by the following equation:

$$P = (N-2)^2 \qquad (2)$$

where N is the number of elements in a fiber. Therefore, all of those peaks in the transform shown in FIG. 4 are related to internal elements (e.g., elements 220 and 230) and are not related to end elements (elements 210 and 240).

In order to obtain information about end elements 210 and 240, one may attach extension elements 205 and 245, as shown in FIG. 3. Attachment of extension elements 205 and 245 make elements 210 and 240 constructive internal elements. Such attachment allows one to obtain information for elements 210 and 240, as well as 220 and 230. Preferably, each of extension elements 205 and 245 is well characterized, that is has at least one known parameter, or quality from which one or more parameters can be derived, in order to simplify the fitting procedure of the device being analyzed. Such parameters include length, intrinsic birefrigence, and angular misalignment.

As described briefly above, secondary peak identification helps to identify primary peaks, which provide PMD related information regarding specific internal elements of the composite fiber. Because secondary peaks will only appear in a transform when there are at least two internal elements, secondary peak identification can only occur when there are two or more internal elements (i.e., a total of four or more elements). Normally, as described above, the experimental transform of a four element fiber contains two primary and two secondary peaks.

The method of this invention can be applied to the peaks that appear in such a transform. First, a raw PMD position for each of the peaks in the experimental transform is determined. For example, peak 216 of FIG. 4 is determined to have a raw PMD position of 4.255. Second, at least one calculated position is calculated using the raw peak positions. For example, a calculated position may be 1.891 ps, which is a difference between raw primary peaks 217 and 216 (6.146 ps−4.255 ps=1.891 ps). Third, the calculated positions are compared with the raw positions (e.g., comparing calculated position 1.891 ps with raw position 1.891 ps). And finally, the order of each peak is identified by matching the calculated positions with the raw positions. Identification is achieved when a calculated position matches another raw position because this match confirms that the matched raw peak (e.g., peak 215) is a secondary peak and that raw peaks (e.g., peaks 216 and 217) used to compute the calculated position are primary peaks.

When one or more peaks can not be identified using the above identified method, the method according to this invention may include calculating a tertiary calculated position by adding to or subtracting from a calculated position (which is itself a sum or difference of primary peak positions) another primary peak position. This additional calculating step is especially useful when a large number of peaks appear in a transform because of the likely appearance of tertiary peaks. However, when a large number of calculated combinations is possible, a computer program may be useful to facilitate the calculation, comparison, and identification steps.

Once all the primary peaks of an experimental transform are identified, the number of internal elements may be determined. This number can be compared with a number calculated according to equation (2). Once the number of internal elements is determined, the PMD may be determined from their peak positions.

EXAMPLE 2

The number of elements that make up an optical device, such as an optical fiber, may be so large that peak identification is rendered difficult if not impossible. In such a case, an alternative method according to this invention may be used. For example, FIG. 5 shows a Fourier transform of a hypothetical one hundred element fiber in which the individual elements have a random distribution of PMD between 0 and 7.2 ps and a uniform random distribution of misaligned axes between −π and +π radians. The computed, or theoretical, mean PMD for the entire fiber is 36 ps and the standard deviation is 15 ps for a range of integration between 1540 nm and 1550 nm. These statistical quantities are consistent with a Maxwellian distribution where the mean is derived from the square root of the sum of the squares of the individual elements. See, e.g., Curti et al., "Statistical Treatment of the Evolution of the Principal States of Polarization on Single Mode Fibers," *J. Lightwave Technology*, August 1990 Vol. 8, pp. 1162–1166 and Poole et al., "Dynamical Equation for Polarization Dispersion," Optics Letters, Vol. 16, March 1991, pp. 372–374.

In contrast to the transform shown in FIG. 4, the transform shown in FIG. 5 does not reveal discernable peaks and is preferably not described in terms of peaks. Instead, as described briefly above, that transform is better characterized by the following equation:

$$F(\tau) = F_o \exp - \frac{\tau}{\tau_d} \quad (3)$$

where τ is the PMD, Fo is a constant, and $\tau_d$ is a decay time constant. By fitting equation (3) to the transform shown in FIG. 5, the decay time constant was determined to be 22 ps. As described below in Example 1, this decay constant can be used to determine various qualities of the constituent elements that make up the composite fiber. Such determinations are described in detail in Example 3–5 with reference to Table 2:

TABLE 2

| Fiber | Length (km) | Mean (ps) | Standard Deviation (ps) | Decay Time (ps) | Type | Li (m) | θi (rads) | Birefringence (ps/km) |
|---|---|---|---|---|---|---|---|---|
| A | 1 | 35 | 13.3 | 18.5 | draw | 2–3 | .25–.4 | 10–80 |
| B | 5 | .27 | 0.65 | .087 | draw | 65–70 | .5 | .14 |
| C | 6.5 | 2.5 | 1.14 | 1.7 | draw | 50 | .5 | 1 |
| D | 20 | 2.1 | .78 | 1.56 | comp | 75 | .2–.4 | N/A |

EXAMPLE 3

Deconstruction of a composite single mode optical fiber, according to this invention, is now described. Fiber A, which is included in Table 2, is 1000 meters long and has a PMD mean and standard deviation of 35 and 13.3 ps, respectively. However, detailed information about the intrinsic birefringence along its length can not be determined using conventional methods and apparatus.

In accordance with this invention, the experimental Fourier transform (not shown) is of the form of equation (3) and has a measured decay time constant $\tau_d$ of 18.5 ps. Qualitatively, this decay time constant indicates a large number $N_i$ of intrinsic perturbations $P_i$ in fiber A.

Figure 6:
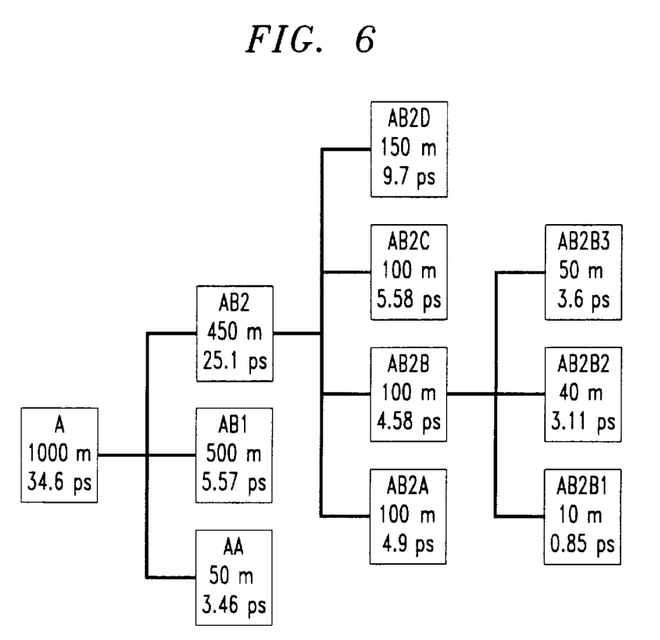
FIG. 6 is a schematic representation of a deconstruction of composite optical fiber A constructed according to this invention.

Detailed quantitative information about composite fiber A was also obtained and is schematically disclosed in FIG. 6. In step 140, the theoretical transform was fit to an experimental transform until the theoretical transform was substantially statistically equivalent to the experimental one. That fit suggested that fiber A was composed of at least three sections: section AA, which had a length of 50 meters and a PMD of 3.46 ps, section AB1, which has a length of 500 meters and a PMD of 5.56 ps, and section AB2, which had a length of 450 meters and a PMD of 25.1 ps. The experimental transforms (not shown) of each of those sections showed substantial wavelength dispersion, which indicated a high concentration of intrinsic perturbations in each of those sections.

By applying the method of this invention to section AB2, additional qualities of that section were obtained. In accordance with this invention, a theoretical transform was fit to the experimental transform characterizing section AB2. This revealed that section AB2 was actually composed of four subsections: subsection AB2A, which has a length of 100 meters and a PMD of 4.9 ps, subsection AB2B, which had a length of 100 meters and a PMD of 4.58 ps, subsection AB2C, which has a length of 100 meters and a PMD of 5.58 ps, and subsection AB2D, which had a length of 150 meters and a PMD of 9.7 ps. Once again, the experimental transforms of subsections AB2A, AB2B, AB2C, and AB2D show wavelength dispersion that indicated a high concentration of intrinsic perturbations. Furthermore, the experimental transforms of the subsections indicated that the average spacing $L_i$ between intrinsic perturbations $P_i$ was still considerably shorter than the subsection lengths.

In order to further resolve, or deconstruct, subsection AB2B, a theoretical transform was again fit to the experimental transform of subsection AB2B. This indicated that subsection AB2B was really composed of at least three elements: element AB2B1, which had a length of 10 meters and a PMD of 0.85 ps, element AB2B2 which had a length of 40 meters and a PMD of 3.11 ps, and element AB2B3, which had a length of 50 meters and a PMD of 3.6 ps. In contrast to the experimental transform of subsection AB2B, minimum wavelength dispersion was observed, which indicated that the local birefringence of the individual elements was finally measured.

The deconstruction of fiber A in this example determined optimum lengths that yielded the most information about the intrinsic perturbations of individual elements and combinations of elements. In particular, the optimum lengths were found to be between 10 and 50 meters (including section AA and elements AB2B1, AB2B2, and AB2B3). The birefringence values of those lengths were substantially constant as a function of distance and indicated that they had a small number of intrinsic perturbations. Theoretical transforms were then fit accurately to the experimental transforms that correspond to those lengths in accordance with this invention.

Figure 7:
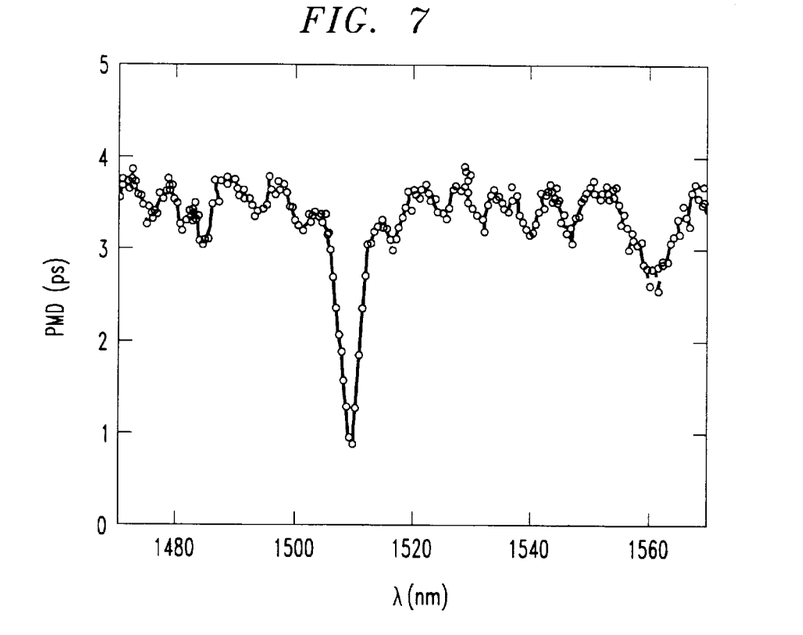
FIG. 7 is experimental PMD wavelength-dependent data for section AA of optical fiber A with high birefringence.
Figure 8:
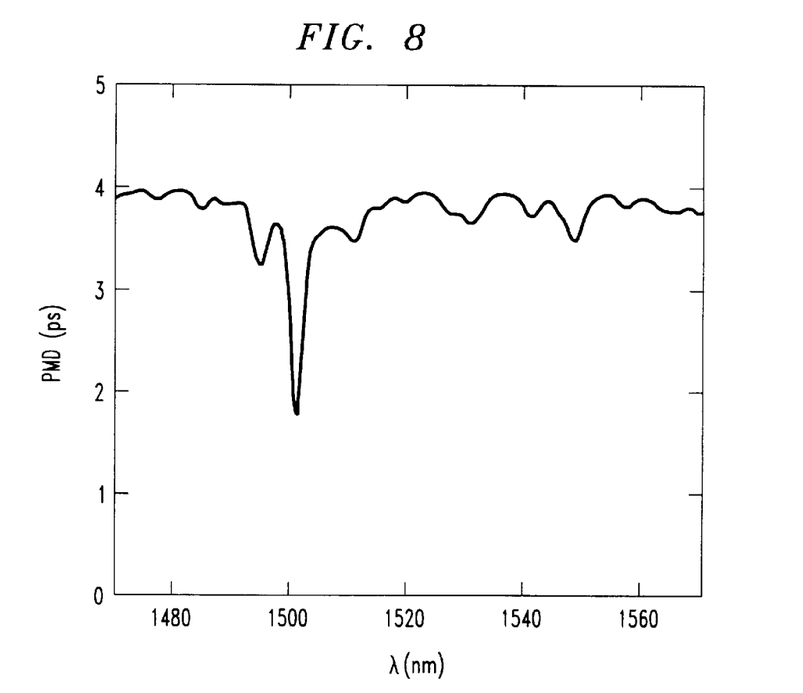
FIG. 8 is theoretical PMD wavelength-dependent data for section AA of optical fiber A. The analytical model used to construct the theoretical PMD data assumed an average spacing between intrinsic perturbations of 3.3 m, an average misalignment angle of 0.37 radians, a uniform birefringence of 80 ps/km, and axes of birefringence that rotate linearly with axial distance so that the total rotation along its length is 3 $\pi/2$ radians.

For example, FIG. 7 shows PMD wavelength-dependent data for section AA of fiber A. The data are relatively constant as a function of wavelength, except that there is a sharp dip at 1509 nm. The transform of that data is statistically equivalent to a theoretical transform that has a uniform birefringence over a length with intrinsic perturbations $P_i$ with randomly distributed misalignment along that length. FIG. 8 shows theoretical PMD data that correspond to the statistically equivalent theoretical transform. The theoretical PMD data shown in FIG. 8 was based on an average spacing $L_i$ of intrinsic perturbations $P_i$ of 1.75 meters, a misalignment angle θ of 0.37 radians, a uniform birefringence of 80 ps/km, and axes of birefringence that rotates linearly with distance for a total rotation of 3 π/2 radians over the length of section AA. The rotation of the axes of birefringence is believed to have caused the sharp dip at 1509 nm shown in FIG. 8.

Figure 9:
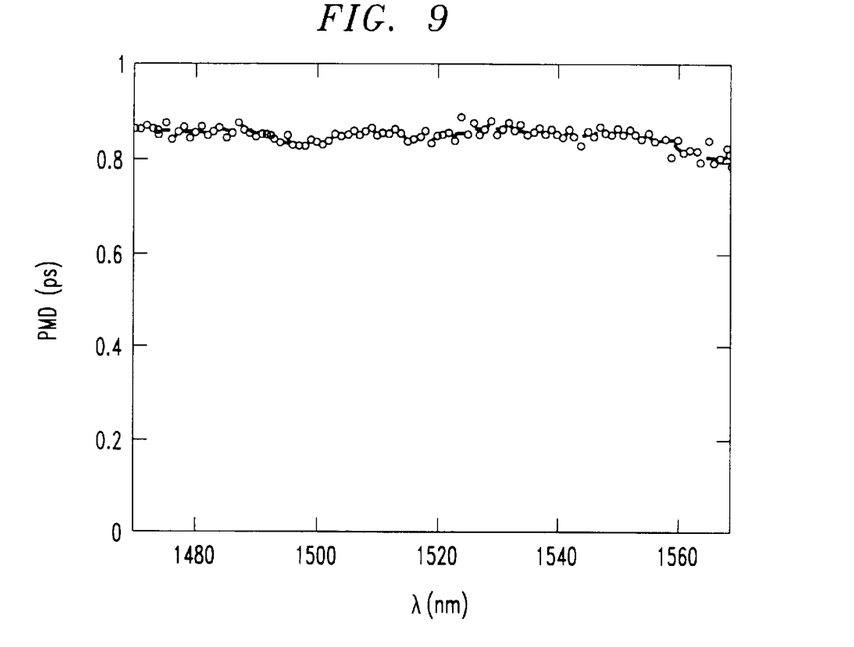
FIG. 9 is experimental PMD wavelength-dependent data for section AB2B3 of optical fiber.
Figure 10:
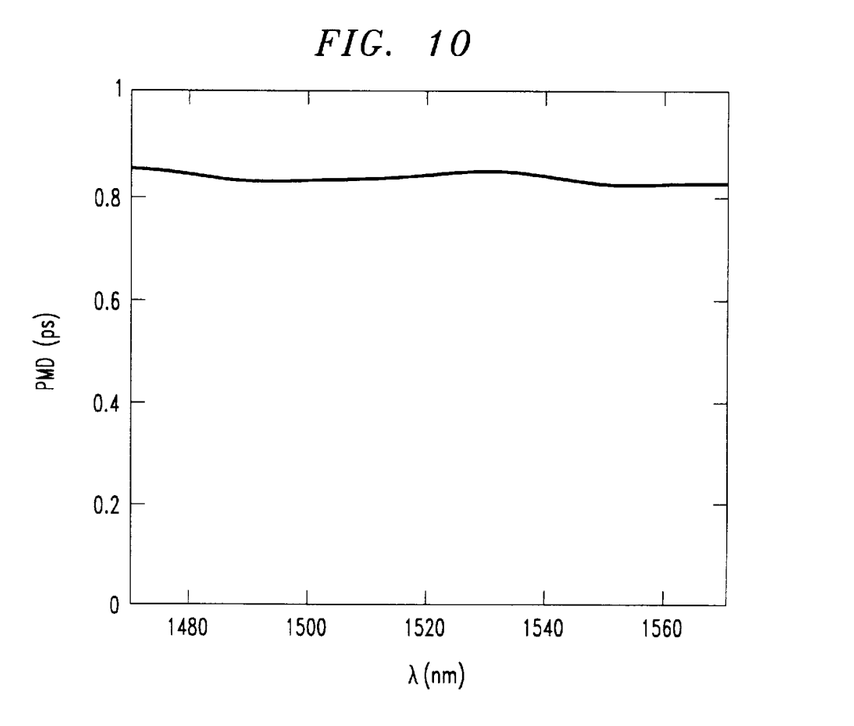
FIG. 10 is theoretical PMD wavelength-dependent data for section AB2B3 of composite optical fiber A. The analytical model used to construct the theoretical PMD data assumed an average spacing between intrinsic perturbations of 2.5 m, a range of misalignment angle of 0.37 radians, and a uniform birefringence of 85 ps/km.

FIG. 9 shows experimental PMD wavelength-dependent data (the open circles) and an equivalent function that fits that data (the solid line) that characterize element AB2B3. In contrast to FIG. 7, FIG. 9 does not show a dip at any wavelength. This indicates that the axes of birefringence did not substantially rotate with distance. Moreover, the dependence on wavelength of FIG. 9 is nearly flat with very small variations. The theoretical PMD shown FIG. 10 that was fit to the experimental data was based on a spacing $L_i$ between intrinsic perturbations $P_i$ of 2.5 meters, a misalignment angle θ of 0.37, and a uniform birefringence of 85 ps/km. The theoretical PMD shown in FIG. 10 provided good qualitative agreement with the experimental data shown in FIG. 9. Also, in accordance with this invention, the transforms of the theoretical function shown in FIG. 10 and the experimental data shown in FIG. 9 were substantially statistically equivalent.

Moreover, in accordance with this invention, a theoretical transform was fit to experimental PMD data that characterizes element AB2B2 based on an average spacing of intrinsic perturbations of 2 meters, a misalignment angle of 0.37 radians, and a uniform birefringence of 100 ps/km. Because elements AB2B1, AB2B2, and AB2B3 were adjacent, it was determined that the fiber had a 100 meter portion (i.e., 10+40+50=100 meters) having a birefringence that was fairly uniform and had a spacing between intrinsic perturbations $L_i$ of about 2.5 meters.

Rigorous quantitative deconstruction of other sections and subsections were performed on fiber A but with reduced accuracy because intrinsic perturbations $P_i$ and the number of those perturbations $N_i$ increased for longer lengths and the local birefringence acquired a positional dependence for certain sections and subsections. This dependence was particularly evident for subsection AB1, which appeared to have a birefringence that was five times lower than adjacent sections AA and AB2A.

Although rigorous quantitative deconstruction yielded less than ideal results for certain sections of fiber A, a general qualitative view did emerge from that analysis. That view revealed a first portion that extends 50 meters from one of the fiber ends with a high birefringence of about 80 ps/km and a relatively low average distance between internal perturbations of about 3 meters. In a second portion, which extended for about 500 meters from the internal end of the first portion, the average birefringence substantially decreased to about ⅕ of the first portion. In a third portion, the birefringence increased to a value of about 80 ps/km with an average spacing between intrinsic perturbations $L_i$ of about 2.5 meters. It was further determined that the range of fluctuations in misalignment angle for this fiber was relatively constant at about 0.4 radians.

EXAMPLE 4

An example of deconstruction of a single mode fiber with low birefringence according to this invention is now described. Ten sample fiber draws ranging in length from about 5 to about 6.5 km were tested and seven of these ten draws had PMD values that were too small to determine any useful information. Two draws B and C, which are included in Table 2, of the remaining three draws had sufficient PMD to be analyzed in accordance with this invention. It should be noted, however, that the method of this invention could have been used to analyze the remaining draws if the means used to measure the PMD of those draws was sufficiently sensitive.

Figure 11:
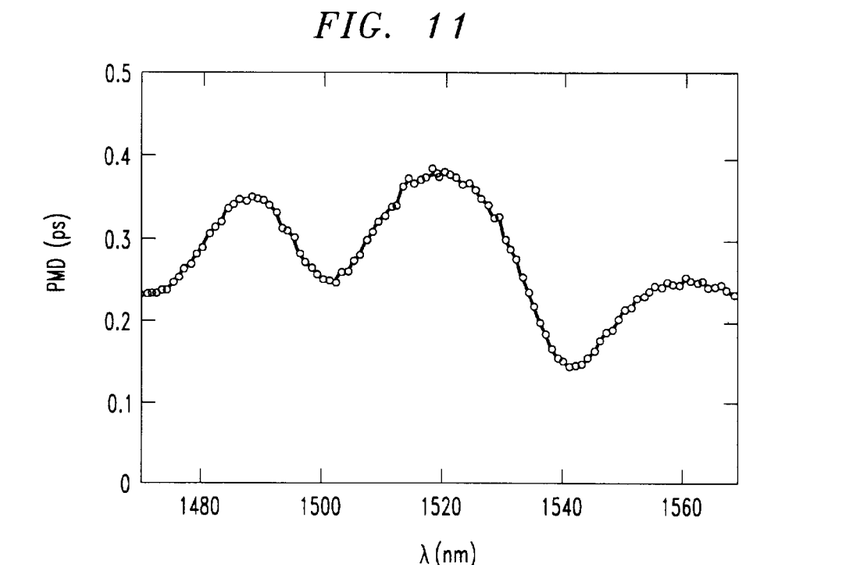
FIG. 11 is experimental PMD wavelength-dependent data for fiber draw B.
Figure 12:
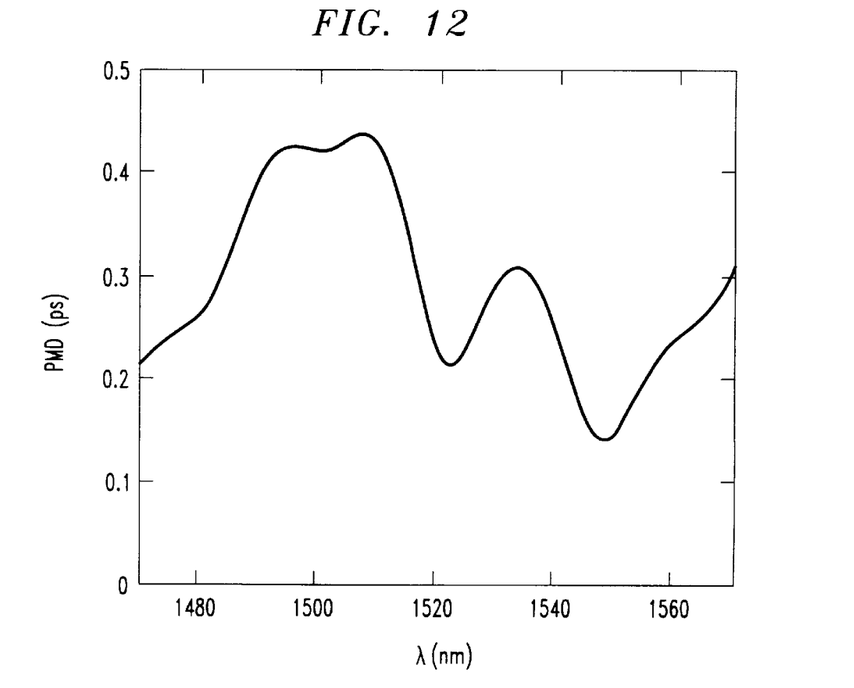
FIG. 12 is theoretical PMD wavelength-dependent data for fiber draw B. The analytical model used to construct the theoretical PMD data assumed an average spacing between intrinsic perturbations of 67 m, a range of average misalignment angles of 0.5 radians, and a uniform birefringence of 0.14 ps/km.

FIG. 11 shows PMD wavelength-dependent data (the open circles) that characterize draw B, which is included in Table 2. That PMD data was fit to a function (the solid curve of the same FIG.) for subsequent fitting with an analytically/theoretically derived model. Fitting in accordance with this invention yielded a statistically equivalent fiber having a uniform birefringence of 0.14 ps/km, an average spacing between intrinsic perturbations $L_i$ of 66 meters, and a misalignment angle θ of 0.5 radians.

Draw C, which also had sufficient PMD to be analyzed, had a relatively large birefringence of 1 ps/km, but had an average spacing $L_i$ between intrinsic perturbations $P_i$ of 50 meters and a misalignment angle θ of about 0.5 radians, which were relatively similar to draw B.

A comparison between draws B or C and composite fiber A reveals two important differences. First, the intrinsic birefringence of normal PMD draws B or C is one to two orders of magnitude lower than high PMD fiber A. And second, the average spacing between internal perturbations of normal draw B or C is more than an order of magnitude larger than high PMD fibers. In other words, the density of intrinsic perturbations is much smaller in low PMD fibers than in high PMD fibers.

EXAMPLE 5

Figure 13:
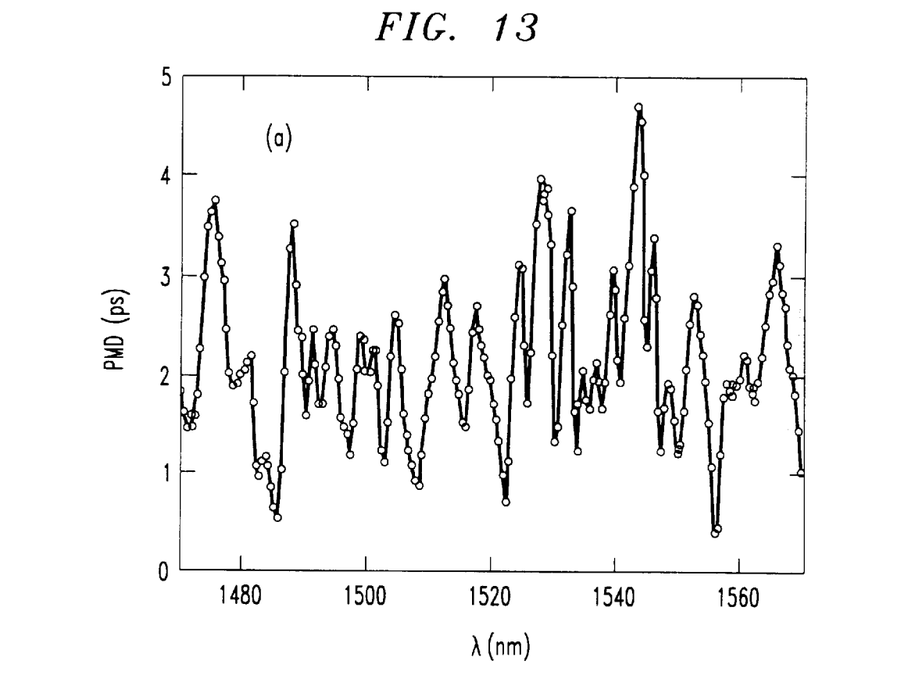
FIG. 13 is experimental PMD wavelength-dependent data for composite optical fiber D, which is composed of four concatenated elements.

Deconstruction of another composite single mode optical fiber according to this invention is now described. Fiber D, which is included in Table 2, is composed of four concatenated draws, each of which has a length of 5 kilometers. FIG. 13 shows experimental PMD wavelength-dependent data for fiber D. That data was Fourier transformed and an exponential function was fit to that transformed data, yielding a decay time constant of 1.6 ps and poorly resolved peaks at 0.6 ps and 1.6 ps.

The initial parameters used to estimate a theoretical model of fiber D may be partially based on the information obtained by fitting the transformed data and partially based on information obtained from a fiber draw with "normal" parameters (e.g., draw D, which has a substantially low intrinsic birefringence of about 0.14 ps/km and an average spacing $L_i$ between intrinsic perturbations $P_i$ of about 65–70 meters). Also, the extrinsic splice angles $\theta_e$ were randomly distributed between $-\pi$ and $+\pi$ radians when using the Stokes representation of those angles.

Figure 14:
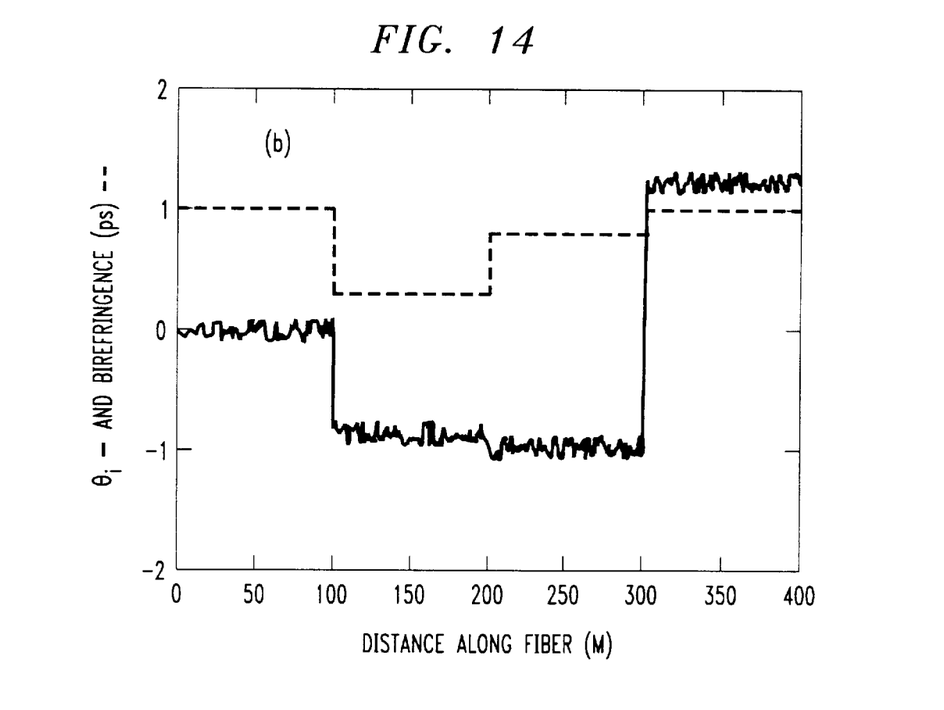
FIG. 14 includes a dashed line, which is theoretically derived birefringence position-dependent data for composite optical fiber D, and a solid line, which is the corresponding theoretically derived misalignment angle data for the same optical fiber. Both lines assumed that the four elements that make up fiber D have PMDs of 2 ps, 0.6 ps, 1.6 ps, and 2 ps and that the extrinsic misalignment angle varies randomly between $-\pi$ and $+\pi$.

The intrinsic and extrinsic angles chosen have a substantial impact on the accuracy of the fiber qualities determined in accordance with this invention. The solid and dashed curves of FIG. 14 are statistically equivalent theoretical models of PMD and birefringence, respectively, as a function of position along the length of fiber D. Nonetheless, based on the estimates described above, the four draws that make up fiber D were determined in accordance with this invention to have birefringence values of 0.4, 0.12, 0.32, and 0.4 ps/km, an average intrinsic spacing of 75 meters, and a misalignment angle of 0.2 radians.

It has been discovered that the three randomly chosen extrinsic angles $\theta_e$, which indicate the relative orientation of adjacent sections, have a significant impact on the fit obtained in accordance with this invention. Unfortunately, this increases the uncertainty in the parameters obtained for fiber D. In addition, intrinsic angle $\theta_i$ has a substantial impact on the fit, however, it provides a useful feature for qualitative interpretation of the composite fiber. For example, when the magnitude of $\theta_i$ is less than 0.05 radians, the theoretical transform acquires a shape with four sharp peaks, such as the transform shown in FIG. 4. However, when θi is increased, those peaks have been found to broaden until there is a complete loss of resolution at $\theta i \geq 0.5$ radians. This broadening phenomenon reveals an interactive role between intrinsic and extrinsic perturbations in composite fibers.

It will be understood that the foregoing is only illustrative of the principles of the invention and that various modifications can be made by those skilled in the art without departing from the scope and spirit of the invention.

What is claimed is:

1. A method of analyzing an optical device, said method comprising:
   providing experimental wavelength-dependent PMD data that characterizes said device;
   Fourier transforming said experimental data to construct an experimental Fourier transform;
   calculating a theoretical Fourier transform that depends on at least one parameter that characterizes said device;
   fitting said theoretical transform to said experimental transform by varying said at least one parameter; and
   determining a quality of said device based on said at least one parameter.

2. The method of claim 1 wherein said providing comprises calculating PMD of said device from measured transmission responses of said device.

3. The method of claim 2 wherein said calculating comprises using a Jones-matrix eigenanalysis technique.

4. The method of claim 3 wherein said using a Jones matrix method comprises:
   launching a polarized light beam having three sequential states of polarization at more than one wavelength corresponding to input electric field Jones vectors;
   measuring said transmission responses of said device for each of said states at each wavelength;
   calculating Stokes parameters based on said measuring said responses;
   computing a Jones matrix for said device from said input and output vectors; and
   computing the PMD of said device from said computing said Jones matrix.

5. The method of claim 1 wherein said Fourier transforming comprises:
   Fourier transforming said experimental data to obtain transformed experimental data; and
   fitting a function to said transformed experimental data to construct an experimental Fourier transform function.

6. The method of claim 5 wherein said fitting a function comprises fitting an exponential function to said experimental transform.

7. The method of claim 6 wherein said exponential function is a product of a constant coefficient and an exponential term.

8. The method of claim 7 wherein said exponential term comprises an exponent, said exponent being equal to said PMD divided by a decay time constant.

9. The method of claim 6 wherein said fitting an exponential function comprises fitting using linear regression.

10. The method of claim 1 wherein said calculating a theoretical transform comprises:
    calculating a theoretical PMD as a function of wavelength; and
    Fourier transforming said theoretical PMD to construct said theoretical Fourier transform.

11. The method of claim 10 wherein said calculating said theoretical PMD comprises using a transmission matrix method.

12. The method of claim 11 wherein said device comprises at least one optical element, said calculating comprises using said transmission matrix method when said at least one optical element comprises a small number of optical elements.

13. The method of claim 12 wherein said calculating comprises using said transmission matrix method when said small number of optical elements is less than about 8 optical elements.

14. The method of claim 10 wherein said calculating said theoretical PMD comprises using Principal States of Polarization and Differential Group Delays.

15. The method of claim 14 wherein said calculating comprises using Principal States of Polarization and Differential Group Delays when said large number of optical elements is greater than about 8 optical elements.

16. The method of claim 10 wherein said calculating comprises constructing said theoretical transform wherein said at least one parameter at least includes a quantity of optical elements.

17. The method of claim 16 wherein said at least one parameter is calculated from a group consisting of a misorienatation angle and an intrinsic birefringence for said optical elements.

18. The method of claim 10 wherein said device comprises a single mode fiber draw, wherein said determining comprises determining a quality selected from a group consisting of an average spacing of intrinsic perturbations in said draw, an intrinsic birefrigence of said draw, and an angular misalignment of Stoke's vectors of Principal States of Polarization relative to intrinsic birefringence axes, and any combination thereof.

19. The method of claim 1 wherein said fitting comprises varying said at least one parameter until said transforms are substantially statistically equivalent.

20. The method of claim 19 wherein each of said transforms has at least one associated statistical quantity, and wherein said transforms are statistically equivalent when a difference between at least one of said at least one associated quantities is minimized.

21. The method of claim 20 wherein an associated quantity is selected from the group consisting of a mean and a standard deviation.

22. The method of claim 19 wherein said device comprises a small number of optical elements and said experimental transform includes at least one discernable peak, said fitting comprises determining an order of said peak, wherein said order is selected from a group consisting of primary, secondary, and tertiary orders, and wherein each primary peak corresponds to a different one of said optical elements, each secondary peak corresponds to mixing of two of said optical elements, and each tertiary peak corresponds to mixing of at least two of said optical elements.

23. The method of claim 22 wherein said experimental transform includes at least two discernable peaks, said determining an order comprises:
determining a raw position for each of said at least two peaks;
computing a calculated position using two of said at least two peaks;
comparing said calculated position with said at least one of said raw positions; and
identifying an order of each of said peaks by matching said calculated positions with at least one of said raw positions.

24. The method of claim 23 wherein said computing calculated position comprises summing any two raw positions.

25. The method of claim 23 wherein said computing calculated position comprises subtracting any one raw position from another raw position.

26. The method of claim 23 wherein said computing comprises computing two calculated positions, said method further comprising comparing two calculated positions.

27. The method of claim 23 wherein said identifying an order comprises matching a raw position with a sum position or difference position.

28. The method of claim 1 wherein said plurality of concatenated optical elements comprises a first end optical element, a second end optical element, and at least one internal optical element, and wherein said determining said quality comprises determining a quantity of internal optical elements of said device.

29. The method of claim 28 wherein said determining further comprises determining a PMD of each of said internal optical elements.

30. The method of claim 29 wherein said determining further comprises determining a quality of said end optical elements by attaching a first extension optical element to said first end optical element and a second extension optical element to said second end optical element.

31. The method of claim 30 wherein each of said extension optical elements has at least one known parameter selected from a group consisting of a length, an average spacing of intrinsic perturbations, an intrinsic birefrigence, and an angular misalignment.

32. The method of claim 1 wherein said providing, Fourier transforming, calculating, and fitting is performed repeatedly for a single device, and wherein said determining of said quality comprises calculating an average value based on said repeated performances.

33. The method of claim 1 wherein said experimental data is used to sequentially analyze different elements that make up said device.

34. The method of claim 1 wherein said device is a composite optical fiber.

35. An apparatus for analyzing an optical device, said apparatus comprising:
means for providing experimental wavelength-dependent PMD data that characterizes said device;
means for Fourier transforming said experimental data to construct an experimental Fourier transform;
means for calculating a theoretical Fourier transform that depends on at least one parameter that characterizes said device;
means for fitting said theoretical transform to said experimental transform by varying said at least one parameter; and
means for determining a quality of said device based on said at least one parameter.

36. The apparatus of claim 35 wherein said means for providing comprises means for obtaining PMD of said device from measured transmission and reflection responses of said device.

37. The apparatus of claim 36 wherein said means for obtaining uses a Jones-matrix eigenanalysis technique.

38. The apparatus of claim 37 wherein said means for obtaining comprises:
means for launching a polarized light beam having three sequential states of polarization at more than one wavelength corresponding to input electric field Jones vectors;
means for measuring said transmission and reflection responses of said device for each of said states at each wavelength;
means for calculating Stokes parameters based on measuring said responses;
means for converting said Stokes parameters to output optical electric field Jones vectors;
means for computing a Jones matrix for said device from said input and output Jones vectors; and
means for computing the PMD of said device based on said Jones matrix.

39. The apparatus of claim 35 wherein said means for calculating a theoretical transform comprises:
means for calculating a theoretical PMD as a function of wavelength; and
means for Fourier transforming said theoretical PMD to construct said theoretical Fourier transform.

40. The apparatus of claim 38 wherein said means for calculating said theoretical PMD comprises means for applying a transmission matrix method.

41. The apparatus of claim 40 wherein said device comprises at least one optical element, said means for calculating uses said transmission matrix method when said at least one optical element comprises a small number of optical elements.

42. The apparatus of claim 38 wherein said means for calculating said theoretical PMD calculates using Principal States of Polarization and Differential Group Delays.

43. The apparatus of claim 42 wherein said device comprises at least one optical element, said means for calculating calculates when said at least one optical element comprises a large number of optical elements.

44. The apparatus of claim 38 wherein said device comprises a single mode fiber draw, wherein said quality is selected from a group consisting of an average spacing of intrinsic perturbations in said draw, an intrinsic birefrigence of said draw, and an angular misalignment of Stoke's vectors of Principal States of Polarization relative to intrinsic birefringence axes.

45. The apparatus of claim 35 wherein said means for fitting varies said at least one parameter until said transforms are substantially statistically equivalent.

46. The apparatus of claim 45 wherein each of said transforms has at least one associated statistical quantity, and wherein said transforms are statistically equivalent when a difference between at least one of said at least one associated quantities is minimized.

47. The apparatus of claim 46 wherein an associated quantity is selected from a group consisting of a mean and a standard deviation.

48. The apparatus of claim 45 wherein said device comprises a small number of optical elements and said experimental transform includes at least one discernable peak, said means for fitting determines an order of said peak, wherein said order is selected from a group consisting of primary, secondary, and tertiary orders, and wherein each primary peak corresponds to a different one of said optical elements, each secondary peak corresponds to two of said optical elements, and each tertiary peak corresponds to at least two of said optical elements.

49. The apparatus of claim 48 wherein said experimental transform includes at least two discernable peaks, wherein said means for fitting comprises:

means for determining a raw PMD position for each of said at least two peaks;

means for computing a calculated position using said at least two peaks;

means for comparing said calculated position with said at least one of said raw positions; and means for identifying an order of each of said peaks by matching said calculated positions with at least one of said raw positions.

50. The apparatus of claim 49 wherein said means for computing said calculated position can sum any two raw positions.

51. The apparatus of claim 49 wherein said means for computing said calculated position can subtract any one raw position from another raw position.

52. The apparatus of claim 49 wherein said means for computing computes two calculated positions, said apparatus further comprising means for comparing two calculated positions.

53. The apparatus of claim 49 wherein said means for identifying an order comprises means for matching a raw position with a sum position or difference position.

54. The apparatus of claim 49 further comprising means for determining a PMD for any primary peak by determining where said primary peak occurs in said experimental transform.

55. The apparatus of claim 35 wherein said plurality of concatenated optical elements comprises a first end optical element, a second end optical element, and at least one internal optical element, and wherein said means for determining a quality determines a quantity of internal optical elements of said device.

56. The apparatus of claim 55 wherein said means for determining a quality determines PMD of at least one of said internal optical elements.

57. The apparatus of claim 36 wherein said means for obtaining PMD data comprises a first extension optical element attached to said first end optical element and a second extension optical element attached to said second end optical element.

* * * * *